Nov. 19, 1935.  E. EGER  2,021,295
INTERCHANGEABLE TIRE VALVE
Filed May 9, 1933
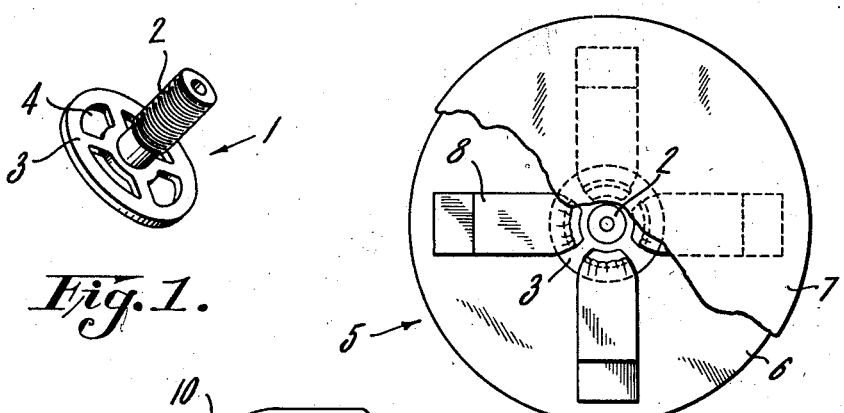
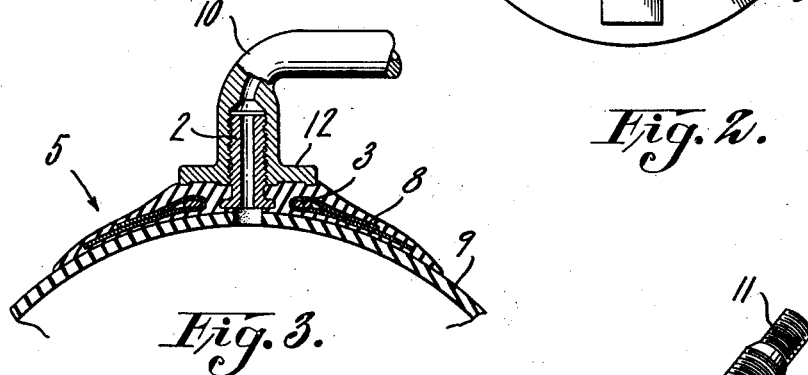
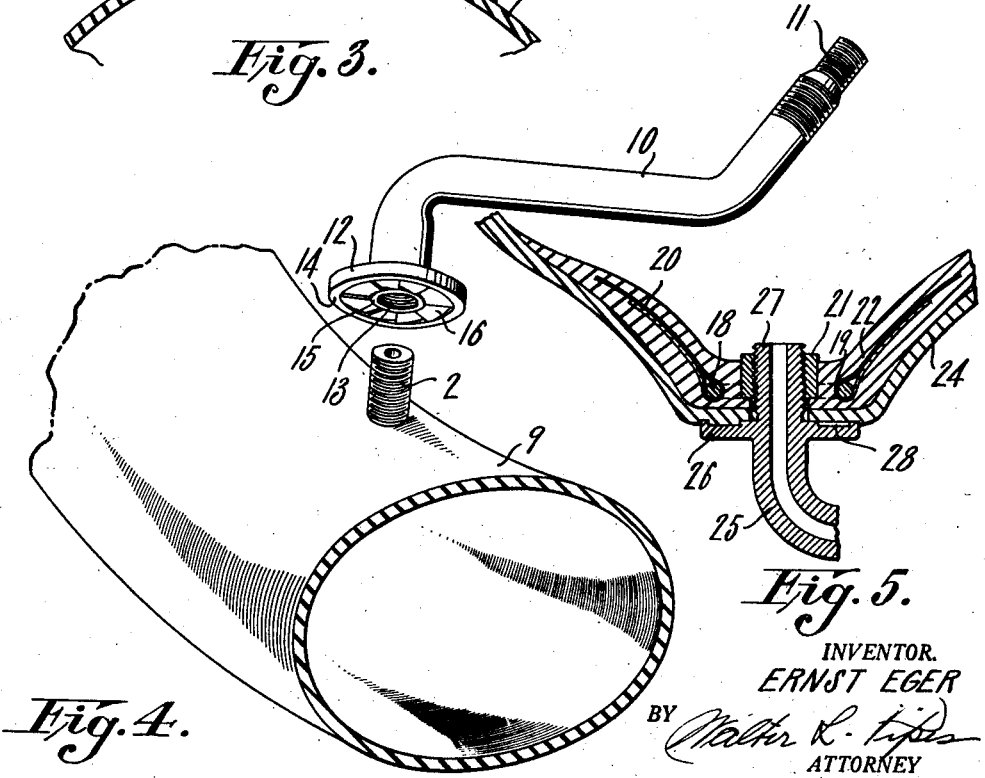
INVENTOR.
ERNST EGER
BY
ATTORNEY Patented Nov. 19, 1935

2,021,295

UNITED STATES PATENT OFFICE 2,021,295

INTERCHANGEABLE TIRE VALVE

Ernst Eger, Grosse Pointe Park, Mich., assignor, by mesne assignments, to United States Rubber Company, New York, N. Y., a corporation of New Jersey Application May 9, 1933, Serial No. 670,077

1 Claim. (Cl. 152—12)

My invention relates to valve stems, and in particular to detachable stems for association with inner tubes for pneumatic tires.

In general, my invention consists of a two-piece valve, comprising a stem and a stud or base portion, wherein the stud forms a part of the reinforcing elements of a valve stem pad and is permanently secured to the tube through the valve stem pad so as to form, in combination, a unitary tube and stud adapted to be detachably associated with the valve stem. The stem has a flanged portion at its base which carries on its tube contacting surface spaced projections which extend outwardly from a central passageway to near the edge of said flange where they engage a marginal rib.

An object of my invention is to provide a stud of a valve stem in unitary relation to a tube so that it will not become lost or will not drop into the interior of the tube. Also the stud, being securely held to the tube, will not rotate or become loose during use or during the application of the valve stem.

A further object of my invention is to utilize the flanged portion of the stud as an anchoring means to which reinforcing elements may be attached. This construction provides a rigid, inextensible member embedded in the valve stem pad so as to greatly strengthen the valve stem pad.

A still further object is to provide a valve stem pad and stud, in combination, so that when the pad is vulcanized to the tube the stud will also be securely attached to the tube in the same operation.

The invention may be better understood by reference to the following detailed description and the accompanying drawing, in which:

Fig. 1 is a perspective view of a stud or base portion of a valve assembly;

Fig. 2 is a plan view, partly broken away, of a stud assembled with a valve stem pad;

Fig. 3 is a transverse sectional view of a complete valve and tube assembly;

Fig. 4 is an exploded view of a section of a tube having an embedded stud, and a valve stem; and Fig. 5 is a cross sectional view of a modified form of the invention.

Referring to the drawing, Fig. 1 illustrates a stud 1 comprising a threaded tubular member 2 flared out at its lower end so as to form a flange 3 having perforations 4. The stud 1, as shown in Fig. 2, is assembled in a valve stem pad 5 so that the flange 3 is laminated between discs of rubber 6 and 7, and preferably in a vulcanizable condition. The perforations 4 in the flange 3 provide means through which strips 8 of inextensible material, preferably fabric, may be looped in lapped relation. The strips 8, encased between discs 6 and 7, extend outwardly from the flange 3 to near the outer margin of the discs 6 and 7. It is preferable that the ends of the strips 8 terminate in step-off relation so as to form a more gradual blending of the strips with the pad 5. When thus assembled, the valve pad 5 is united, as by vulcanization, to an inner tube 9, during which the rubber discs 6 and 7 merge with the tube 9 so that the valve stem pad and tube form a unit. During vulcanization the flange 3 of the stud 1 become firmly embedded between the rubber discs 6 and 7, and firmly connected to the anchoring strips 8 as the latter are also embedded between the rubber discs.

As shown in Figs. 3 and 4, I provide a valve stem 10 having a threaded end 11 for the attachment of a dust cap and containing the usual valve core, both of which are not shown. At the base of the valve stem 10, I provide a flange 12 having internal threads 13, adapted for complementary association with the tubular threaded member 2 of the stud 1. The flange 12, on its tube contacting surface, carries a raised marginal rib 14 at the outer edge of the flange, and an inner raised rib 15 circumscribing the threaded aperture 12. Interposing the ribs 14 and 15 are ratchet-like projections 16 having sloping surfaces so as to prevent rotation of the valve stem 10 after it is applied to the tubular threaded member 2 of the stem 1.

Referring to Fig. 5, in lieu of having an outwardly extending tubular member 2 such as is shown in Figs. 1, 3, and 4, the valve base may be substantially entirely embedded in the pad as shown in Fig. 5. In this figure the valve assembly base is provided with a flange 18 and perforations 19 through which attaching strips 20 are looped as in the other form of the invention. However, the central tubular portion 21 of the base is relatively short and terminates substantially at the outer surface of the pad 22, which is shown as being mounted internally of the inner tube 24. It is obvious, however, that the pad could be mounted externally of the inner tube. A stem 25 carries a flange 26 and terminates in a threaded tubular portion 27 which extends within the tubular portion 21 and has threaded engagement therewith. Teeth 28 on the flange 26 cooperates with the material interposed between it and the flange 18 for clamping the stem in place.

Accordingly, I have provided an interchangeable valve assembly in which the base or stud portion is permanently embedded in a vulcanizable pad which, in turn, is permanently secured, preferably by vulcanization, to the inner tube so that the inner tube pad and base or stud constitute a unitary assembly. The permanent attachment of the base or stud to the inner tube insures a rigid base construction for the application of valve stems in that rotation of the base relative to the inner tube is prevented which eliminates possible leakage of fluid between the flange of the base or stud and the surface of the inner tube. It is to be understood that this interchangeable valve assembly may be used in connection with inflatable articles other than inner tubes.

While I have shown and described certain present preferred embodiments of the invention, it is to be understood that the invention may be otherwise embodied within the spirit thereof and the scope of the appended claim.

Having thus described my invention, what I claim and desire to protect by Letters Patent is:

The combination with an inner tube having an opening therein for the movement of inflating fluid, of a pad permanently secured to said inner tube in cooperative relation to said opening, a valve assembly base having a flange embedded in the material of said pad and fabric anchoring strips secured to the flange and extending outwardly into the material whereby the base is attached to the inner tube by said pad, said base having means for securing a stem thereto, and a stem secured to said base, said stem having a flange provided with teeth terminating in an outer circumferential rib for cooperating with the flange of said base through the intervening material of the pad for preventing relative rotation between the stem and the base.

ERNST EGER.